US009489728B2

(12) United States Patent
Imagawa

(10) Patent No.: US 9,489,728 B2
(45) Date of Patent: Nov. 8, 2016

(54) IMAGE PROCESSING METHOD AND IMAGE PROCESSING APPARATUS FOR OBTAINING AN IMAGE WITH A HIGHER SIGNAL TO NOISE RATIO WITH REDUCED SPECULAR REFLECTION

(71) Applicant: Panasonic Intellectual Property Management Co., Ltd., Osaka (JP)

(72) Inventor: Taro Imagawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 12 days.

(21) Appl. No.: 14/623,138

(22) Filed: Feb. 16, 2015

(65) Prior Publication Data
US 2015/0235375 A1    Aug. 20, 2015

(30) Foreign Application Priority Data

Feb. 18, 2014 (JP) .................................. 2014-028061
Feb. 2, 2015 (JP) .................................. 2015-018503

(51) Int. Cl.
*G06K 9/00*    (2006.01)
*G06T 5/50*    (2006.01)
*G06T 5/00*    (2006.01)

(52) U.S. Cl.
CPC ........ *G06T 5/50* (2013.01); *G06T 5/005* (2013.01)

(58) Field of Classification Search
None
See application file for complete search history.

(56) References Cited

U.S. PATENT DOCUMENTS

| 7,792,367 B2 | 9/2010 | Kanamori et al. | |
| 7,948,622 B2 | 5/2011 | Kanamori et al. | |
| 2009/0135183 A1* | 5/2009 | Sato ................. | G01B 11/002 345/426 |
| 2009/0141027 A1* | 6/2009 | Sato ................. | G01B 11/002 345/426 |
| 2009/0279807 A1 | 11/2009 | Kanamorl et al. | |
| 2010/0283883 A1* | 11/2010 | Sato ................. | G02B 27/283 348/335 |
| 2010/0290713 A1 | 11/2010 | Kanamori et al. | |

(Continued)

FOREIGN PATENT DOCUMENTS

| JP | 05167925 A * | 7/1993 |
| JP | 4324238 B2 | 9/2009 |

(Continued)

OTHER PUBLICATIONS

T. Higo et al., "Realtime Removal of Specular Reflection Component Based on Dichromatic Reflection Model", IEICE Technical Report, vol. 106, No. 230, pp. 77-84, 2006 (with partial English Translation).

*Primary Examiner* — Utpal Shah
*Assistant Examiner* — Wenpeng Chen
(74) *Attorney, Agent, or Firm* — McDermott Will & Emery LLP

(57) ABSTRACT

An image processing method which includes obtaining a normal image captured with all polarization components of light from an object, and a polarization image captured with specific polarization components out of all the polarization components of the light. The method further includes generating a difference image between the normal image and the polarization image; calculating, using pixel values of the difference image, a coefficient to be multiplied by at least one of a pixel value of the normal image and a pixel value of the polarization image; and synthesizing the normal image and the polarization image using a pixel value obtained by multiplying the coefficient by the at least one of the pixel value of the normal image and the pixel value of the polarization image to generate a synthesized image.

6 Claims, 11 Drawing Sheets

(56) References Cited

U.S. PATENT DOCUMENTS

| | | | | |
|---|---|---|---|---|
| 2012/0069181 A1* | 3/2012 | Xue | ............ | G01J 3/0229 |
| | | | | 348/148 |
| 2012/0242835 A1* | 9/2012 | Li | ............ | G08G 1/167 |
| | | | | 348/148 |
| 2012/0268602 A1* | 10/2012 | Hirai | ............ | G06K 9/00798 |
| | | | | 348/148 |
| 2013/0076932 A1* | 3/2013 | Chhibber | ............ | A61B 5/0077 |
| | | | | 348/222.1 |
| 2013/0136306 A1* | 5/2013 | Li | ............ | G02B 27/28 |
| | | | | 382/103 |
| 2014/0092227 A1* | 4/2014 | Kanamori | ............ | G01J 1/0209 |
| | | | | 348/68 |
| 2014/0247357 A1* | 9/2014 | Sekiguchi | ............ | G01N 21/4738 |
| | | | | 348/148 |
| 2015/0029389 A1* | 1/2015 | Masanori | ............ | H04N 5/2254 |
| | | | | 348/373 |
| 2015/0219552 A1* | 8/2015 | Kanamori | ............ | G01N 21/21 |
| | | | | 356/369 |
| 2015/0256733 A1* | 9/2015 | Kanamori | ............ | H04N 5/2354 |
| | | | | 348/234 |

FOREIGN PATENT DOCUMENTS

| | | |
|---|---|---|
| JP | 2011-130808 A | 7/2011 |
| JP | 2012-084121 A | 4/2012 |
| WO | 2008/099589 A1 | 8/2008 |

* cited by examiner

IMAGE PROCESSING METHOD AND IMAGE PROCESSING APPARATUS FOR OBTAINING AN IMAGE WITH A HIGHER SIGNAL TO NOISE RATIO WITH REDUCED SPECULAR REFLECTION

CROSS REFERENCE TO RELATED APPLICATION

The present application is based on and claims priority of Japanese Patent Application No. 2014-028061 filed on Feb. 18, 2014 and Japanese Patent Application No. 2015-018503 filed on Feb. 2, 2015. The entire disclosure of the above-identified application, including the specification, drawings and claims is incorporated herein by reference in its entirety.

FIELD

The present disclosure relates to an image processing method and an image processing apparatus for performing image processing on a captured image.

BACKGROUND

Patent Literature (PTL) 1 discloses a method for obtaining an image that exhibits less specular reflection. This method is performed to obtain polarization images of an object that are captured using polarizing filters that are disposed in multiple directions. Analyzing the intensity of specular reflection of the polarization images in the directions and estimating the minimum value of the specular reflection results in obtainment of an image that exhibits less specular reflection.

CITATION LIST

Patent Literature

[PTL 1] Japanese Patent No. 4324238

Non Patent Literature

[NPT 1] T. Higo, D. Miyazaki, and K. Ikeuchi, "Realtime Removal of Specular Reflection Component Based on Dichromatic Reflection Model", IEICE Technical Report, Vol. 106, No. 230, pp. 77-84, 2006

SUMMARY

Technical Problem

Generally, a polarization image that has been captured using a polarization filter has a low S/N ratio, due to a loss of light amount.

The image processing method using the polarization image has a problem in the application under a dark photographing environment because of use of the image with a low S/N ratio.

One non-limiting and exemplary embodiment provides an image processing method and an image processing apparatus that can obtain an image with a higher S/N ratio that exhibits less specular reflection even under a dark environment.

Solution to Problem

The image processing method according to the present disclosure includes: obtaining a normal image captured with all polarization components of light from an object, and a polarization image captured with specific polarization components out of all the polarization components of the light; generating a difference image between the normal image and the polarization image; calculating, using pixel values of the difference image, a coefficient to be multiplied by at least one of a pixel value of the normal image and a pixel value of the polarization image; and synthesizing the normal image and the polarization image using a pixel value obtained by multiplying the coefficient by the at least one of the pixel value of the normal image and the pixel value of the polarization image to generate a synthesized image.

Advantageous Effects

The image processing method and the image processing apparatus according to the present disclosure are effective in obtaining an image with a higher S/N ratio that exhibits less specular reflection even under a dark environment.

BRIEF DESCRIPTION OF DRAWINGS

These and other objects, advantages and features of the invention will become apparent from the following description thereof taken in conjunction with the accompanying drawings that illustrate a specific embodiment of the present invention.

DESCRIPTION OF EMBODIMENT

Embodiments according to the present disclosure will be described with reference to the drawings. The detailed description more than necessary will be omitted. For example, detailed description of well-known facts and overlapping description of substantially identical configurations may be omitted. These prevent the Description from being redundant and make a person skilled in the art to easily understand the Description.

The Inventor provides the Description and the drawings for the person skilled in the art to easily understand the present disclosure, and does not intend to limit the subject matter of the description into the scope of the claims.

(Embodiment 1)

Non-limiting Embodiment 1 will be described with reference to the drawings.

[1-1. Overall Configuration of Image Processing Apparatus]

First, an image processing apparatus 100 according to Embodiment 1 will be described with reference to FIG. 1.

Figure 1:
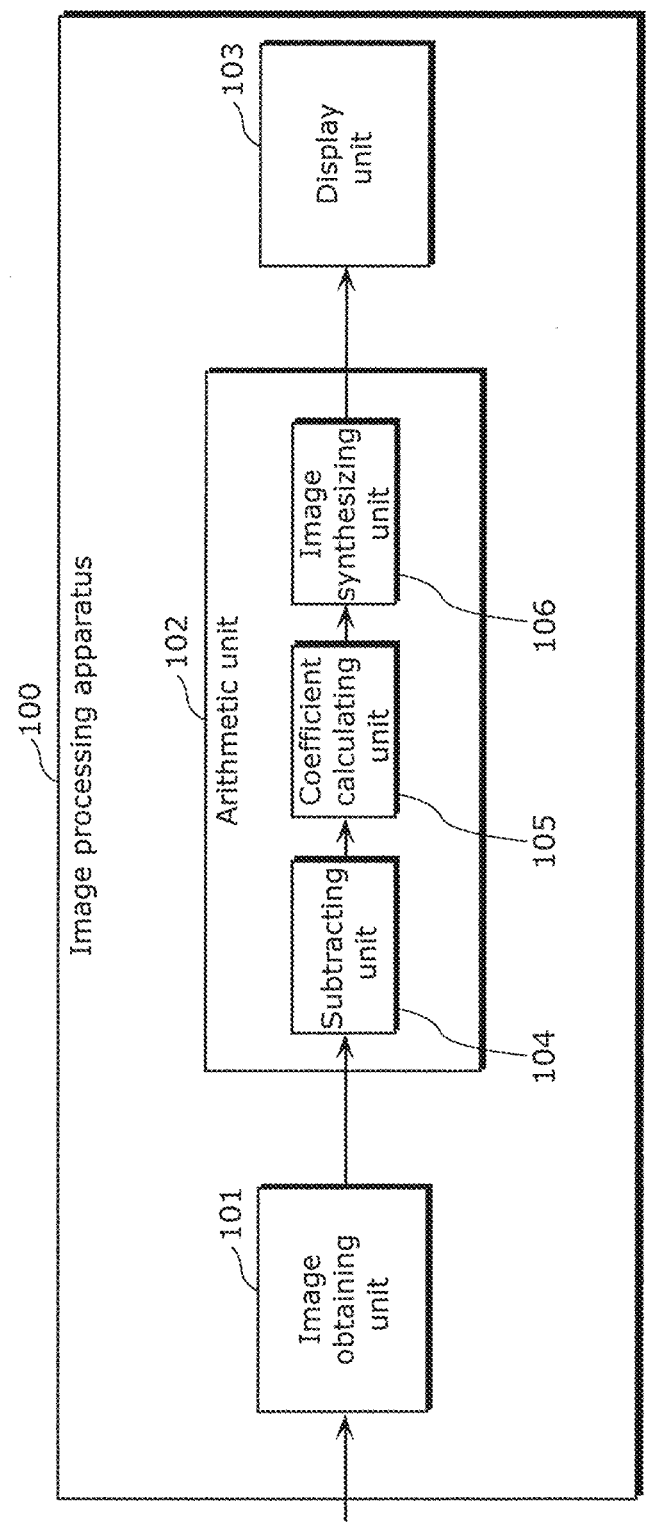
FIG. 1 is a block diagram of an image processing apparatus according to Embodiment 1.

FIG. 1 is a block diagram of the image processing apparatus 100 according to Embodiment 1. As illustrated in FIG. 1, the image processing apparatus 100 includes an image obtaining unit 101, an arithmetic unit 102, and a display unit 103.

The image obtaining unit 101 obtains a normal image and a polarization image that are captured from the same object, from a recording medium connected to the image processing apparatus 100. Here, each of the normal image and the polarization image includes pixels. Each of the pixels has a pixel value related to brightness of the pixel. For example, as the pixel is brighter, the pixel value of the pixel is larger. As the pixel is darker, the pixel value of the pixel is smaller. Thus, a larger pixel value may represent a brighter pixel value, and a smaller pixel value may represent a darker pixel value. A pixel value may be a brightness value, each value of RGB components, or each value of YUV components. For convenience, each of a normal image and a polarization image is described as a gray scale image in the following description.

Here, the normal image is an image captured with all polarization components of light from an object. In other words, a normal image is an image captured without limiting polarization properties or using any polarizing filter and others. In contrast, a polarization image is an image captured with specific polarization components out of all the polarization components of the light from the object. In other words, the polarization image is an image captured with specific polarization components using a polarizing filter and others.

The arithmetic unit 102 is a processing unit that generates an image that exhibits less specular reflection, using the normal image and the polarization image that are obtained by the image obtaining unit 101. Here, the specular reflection represents a reflection component of light which is reflected from a surface of an object, whose angle of incidence is equal to the angle of reflection, and which doe not reflect the colors of the object's innards. In contrast, the diffuse reflection represents a reflection component of incident light reflected in various directions, and has properties that reflect the colors of the object. The arithmetic unit 102 will be described in detail later.

The display unit 103 displays an image signal output from the arithmetic unit 102. The display unit 103 may be any device as long as it can display the image signal. For example, the display unit 103 may be a liquid crystal display panel.

[1-2. Configuration of Arithmetic Unit]

Next, the detailed operations performed by the arithmetic unit 102 will be described with reference to the drawings.

The arithmetic unit 102 includes a subtracting unit 104, a coefficient calculating unit 105, and an image synthesizing unit 106.

The subtracting unit 104 calculates a difference image between a normal image and a polarization image. Specifically, the subtracting unit 104 calculates a difference value between a pixel value of a pixel included in the normal image and a pixel value of a pixel included in the polarization image that is a pixel co-located with the pixel included in the normal image.

When the difference image is calculated, desirably, pixel values of each of the normal image and the polarization image are normalized, and the range of the pixel values is unified. Generally, the polarization image is darker than the normal image because the polarization image is processed through a polarizing filter. Thus, the range of the pixel values differs between the normal image and the polarization image. Simply calculating the difference image with the difference in the range prioritizes the pixel values of the normal image, and reduces the advantages in the subsequent processes. Since the normalizing process solves the problem, the accuracy of the processes according to Embodiment 1 can be improved. Examples of the normalization includes a method of linearly extending a range of pixel values of a polarization image so that a range of pixel values of a normal image almost matches the range of the pixel values of the polarization image.

The normalization is performed on an image to which a non-linear correction such as gamma correction has been applied, after performing an inverse gamma correction in advance so that the image has linear properties in the quantity of incident light and the pixel values. Accordingly, pixel values in a region having regular polarization properties and included in a polarization image approximate pixel values of a normal image.

For the convenience of the description, the configuration for processing using the normal image and the polarization image that have been normalized will be described hereinafter. The subtracting unit 104 may have a configuration in which the normalization is not performed before the processing.

Specifically, the subtracting unit 104 calculates a difference image between a normal image and a polarization image that have been normalized, as indicated in the following Equation 1.

[Math 1]

$$D(x,y) = I_{normal}(x,y) - I_{PL}(x,y) \quad \text{(Equation 1)}$$

Here, (x,y) denotes an x coordinate and a y coordinate of a pixel in an image. D(x,y) in Equation 1 denotes a pixel value of a difference image, $I_{normal}(x,y)$ denotes a pixel value of a normal image after normalization, and $I_{PL}(x,y)$ denotes a pixel value of a polarization image after normalization.

The coefficient calculating unit 105 calculates, using the normal image and the polarization image, a synthetic coefficient α(x,y) for synthesizing the normal image and the polarization image. The method for calculating the synthetic coefficient α(x,y) will be described in detail later.

The image synthesizing unit 106 synthesizes the normal image and the polarization image using the synthetic coefficient α(x,y) calculated by the coefficient calculating unit 105 as indicated Equation 2 below.

[Math 2]

$$I_{no\_ref}(x, y) = (1 - \alpha(x, y)) \cdot I_{normal}(x, y) + \alpha(x, y) \cdot I_{PL}(x, y) \quad \text{(Equation 2)}$$
$$= I_{normal}(x, y) - \alpha(x, y) \cdot D(x, y)$$

$I_{no\_ref}(x,y)$ in Equation 2 denotes a pixel value of a synthesized image. When luminance correction such as gamma correction is necessary, the luminance correction is performed on $I_{no\_ref}(x,y)$. Although Equation 2 expresses a calculation in which each of the normal image and the polarization image is multiplied by a coefficient, one of the normal image and the polarization image may be multiplied by the coefficient.

[1-3. Operations by Image Processing Apparatus]

Next, the detailed operations performed by the image processing apparatus 100 according to Embodiment 1 will be described with reference to the drawings.

Figure 2:
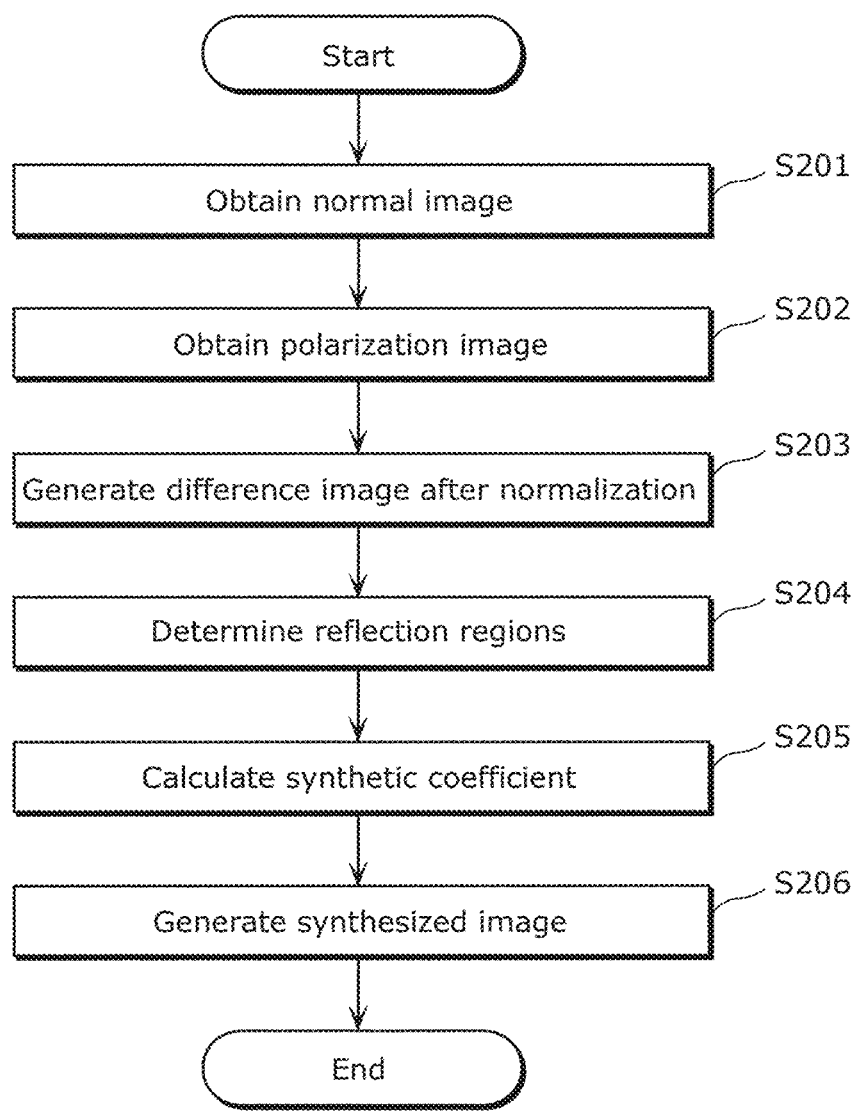
FIG. 2 is a flowchart for describing the entire operations performed by the image processing apparatus according to Embodiment 1.

FIG. 2 is a flowchart for describing the entire operations performed by the image processing apparatus 100 according to Embodiment 1.

Figure 3:
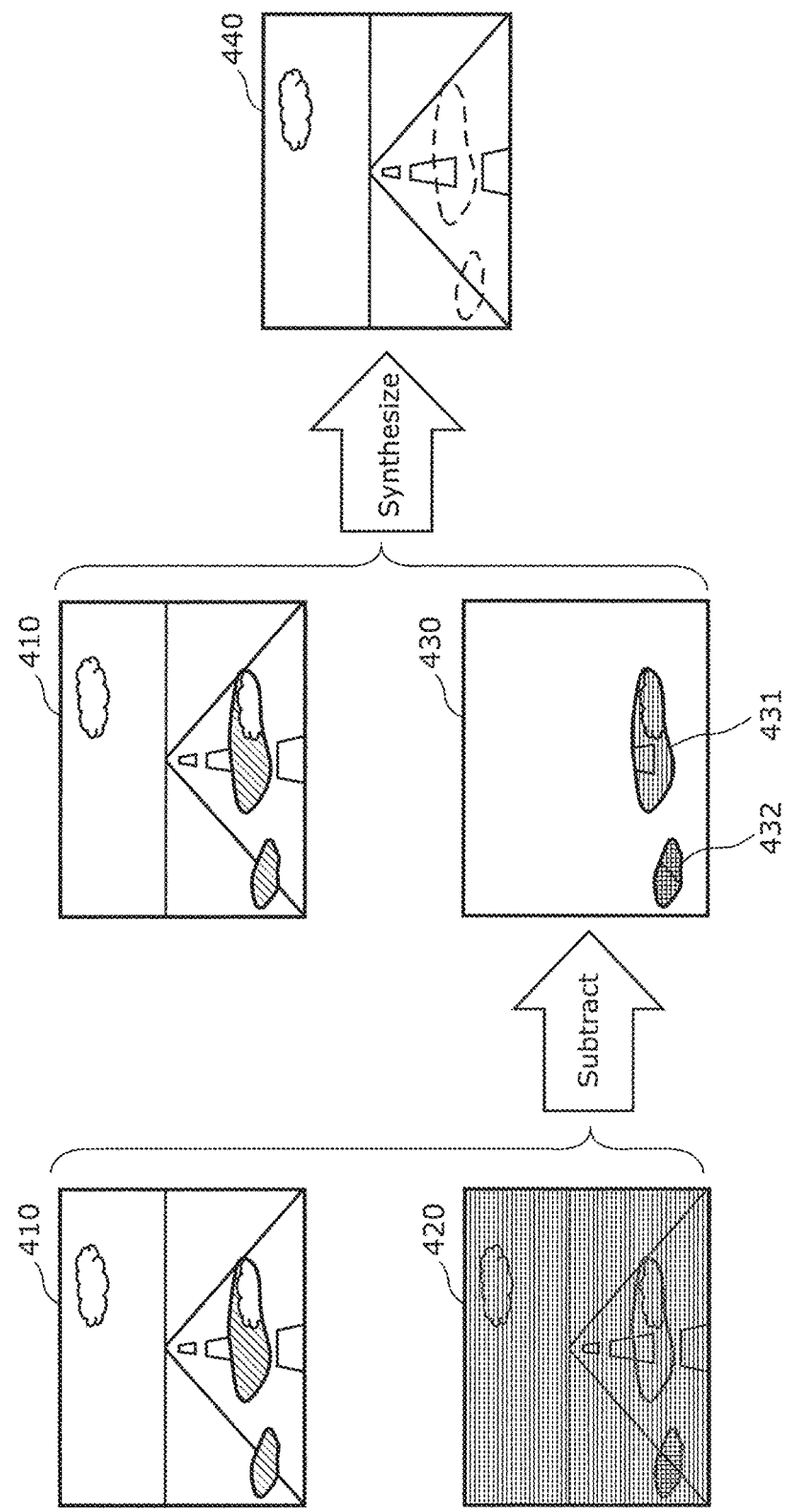
FIG. 3 schematically illustrates an image signal to be processed.

FIG. 3 schematically illustrates an image signal to be processed.

As indicated in FIG. 2, the image obtaining unit 101 first obtains a normal image 410 and a polarization image 420 that are obtained by capturing the same object (S201 and S202). Here, FIG. 3 illustrates reference images of the normal image 410 and the polarization image 420. The normal image 410 of FIG. 3 includes, in the diagonal shaded areas on the image of the road, not the image of the road but the images of the sky and the cloud by specular reflection. In contrast, the polarization image 420 includes the transparent image of the road in the corresponding diagonal shaded areas of the normal image 410, by shielding a portion of the specular reflected light using a polarizing filter and other.

Next, the subtracting unit 104 normalizes luminance values of the normal image 410 and the polarization image 420 so that ranges of the luminance values match, and generates a difference image 430 (D(x,y)) between the normal image 410 and the polarization image 420, based on Equation 1 (S203). As illustrated in FIG. 3, the calculated difference image 430 has the remaining different portions in image of the objects between the normal image 410 and the polarization image 420. Specifically, the difference image 430 has the remaining pixel values of reflection regions 431 and 432.

Next, the coefficient calculating unit 105 determines the reflection regions 431 and 432 for calculating the synthetic coefficient from the difference image 430 (D(x,y)) (S204). The coefficient calculating unit 105 determines, to be each of the reflection regions 431 and 432, a region in which (D(x,y)) is larger than a predetermined threshold th or a pixel region included in the top p % of the histogram of the pixel values of (D(x,y)) (0<p<=100). Accordingly, a region having irregularity in the polarization component can be selectively obtained. The coefficient calculating unit 105 commonly defines such reflection region in each of the normal image 410, the polarization image 420, and the difference image 430. For example, the coefficient calculating unit 105 defines the reflection region using the coordinate values of (x,y). The coefficient calculating unit 105 can refer to pixel values of the reflection regions in the normal image 410, the polarization image 420, and the difference image 430, by setting the reflection regions using the coordinate values.

Next, the coefficient calculating unit 105 calculates the synthetic coefficient α(x,y) using the normal image and the polarization image, in the defined reflection regions (S205). The detailed operations for calculating the synthetic coefficient will be described later.

Finally, the image synthesizing unit 106 generates a synthesized image 440 according to Equation 2 using the synthetic coefficient calculated at Step S205, and outputs the synthesized image 440 to the display unit 103 (S206). The resulting synthesized image 440 is an image that exhibits less specular reflection in the reflection regions 431 and 432.

[1-4. Operations for Calculating Synthetic Coefficient]

Next, the detailed operations for calculating a synthetic coefficient will be described with reference to the drawings.

Figure 4:
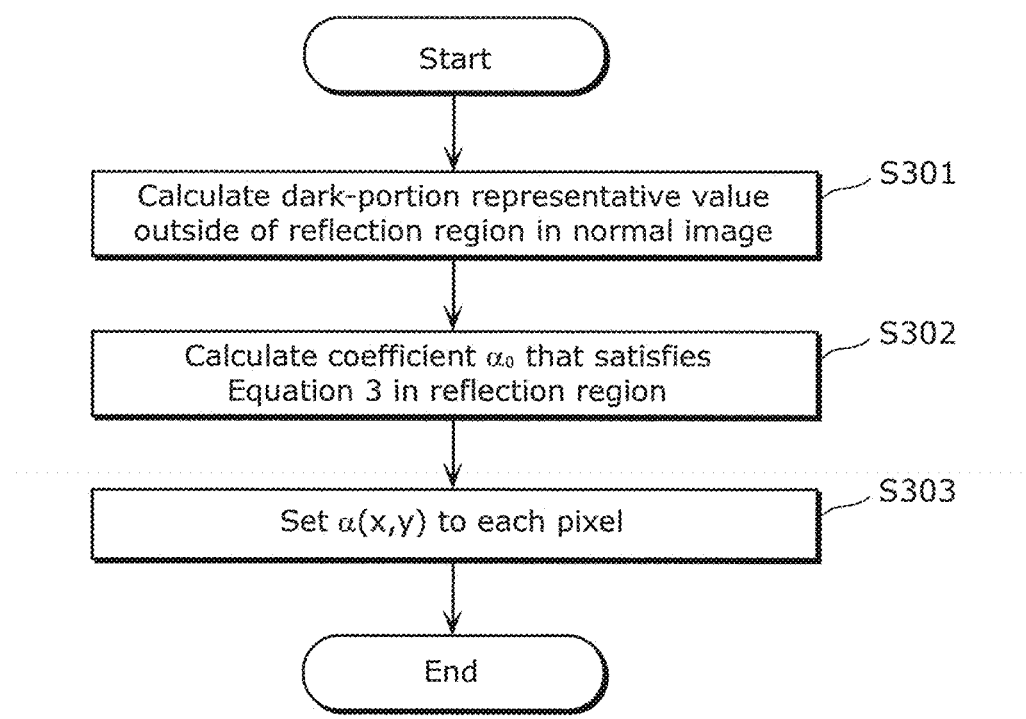
FIG. 4 is a flowchart indicating operations for calculating a synthetic coefficient by a coefficient calculating unit according to Embodiment 1.

FIG. 4 is a flowchart indicating operations for calculating a synthetic coefficient by the coefficient calculating unit 105 according to Embodiment 1.

First, the coefficient calculating unit 105 calculates a dark-portion representative value of a pixel outside of a reflection region R among pixels of a normal image (S301). Here, the dark-portion representative value is a representative value of a dark pixel in a designated region of an image. The dark-portion representative value is, for example, an average, a mode, and a median of the lowest q % of the histogram of pixel values in the designated region (0<q<100). In brief, the dark-portion representative value may be the minimum.

Next, the coefficient calculating unit 105 calculates a coefficient $\alpha_0$ based on Equation 3 below so that a dark-portion representative value in the reflection region R that is in the brace of the left part of Equation 3 is equal to the dark-portion representative value calculated at Step S301 (S302).

[Math 3]

$$\underset{(x,y)\in R}{dark}\{I_{normal}(x, y) - \alpha_0 \cdot D(x, y)\} = \underset{(x,y)\in R}{dark}\{I_{normal}(x, y)\} \quad \text{(Equation 3)}$$

Here, "dark { }" in Equation 3 expresses an operation for calculating a dark-portion representative value of a pixel in a predetermined region. The right part expresses the dark-portion representative value of the pixel outside of the reflection region R in the normal image that is calculated at Step S301.

Next, the coefficient calculating unit 105 sets, as the synthetic coefficient α(x,y), (i) the coefficient α0 calculated from the normal image and the difference image to the reflection region R, and (ii) 0 to a region outside of the reflection region R (S303).

[Math 4]

$$\alpha(x, y) = \begin{cases} \alpha_0 & (x, y) \in R \\ 0 & (x, y) \in \overline{R} \end{cases} \quad \text{(Equation 4)}$$

The coefficient calculating unit 105 calculates the synthetic coefficient α(x,y) as described above. Then, the image synthesizing unit 106 synthesizes the normal image and the polarization image based on Equation 2 using the calculated synthetic coefficient α(x,y), as indicated at Step S206 in FIG. 2. According to Equations 2 to 4, the left part of Equation 3 expresses the dark-portion representative value in the reflection region R of the synthesized image.

In the operations above, the image synthesizing unit 106 synthesizes the normal image and the polarization image only in the reflection regions determined at Step S204 in FIG. 2. Thus, the pixels satisfying α(x,y)=0 are not subject to the synthesizing process, in Equation 2. Thus, the image synthesizing unit 106 may output the pixel values of the input image as they are.

Although α(x,y) is set to 0 in the region outside of the reflection region, α(x,y) may be calculated in the same manner as the operations in the reflection regions.

[1-5. Advantages]

When the normal image exhibits specular reflection, the reflection region R defined using the difference image becomes an image overall having a bright white tint, compared to the reflection region R without any specular reflection. Specifically, the pixel value in the reflection region R becomes larger (brighter) than the pixel value without any specular reflection. Since the region outside of the reflection region R is a region unaffected by the specular reflection, the region includes, as they are, both the dark pixels and the bright pixels originally contained in the object. In the image processing method according to the present disclosure, the normal image and the polarization image are synthesized so that a representative value of dark pixels in the reflection region R whose bright image is captured with influence of the specular reflection matches a representative value of dark pixels outside of the reflection region R. Accordingly, the white tint caused by the specular reflection can be reduced, and an image signal with natural gradations can be obtained. Since the pixels belonging to the region outside of the reflection region R in the normal image can be output as they are, only the specular reflection can be reduced without reducing the brightness of the whole image.

Furthermore, when there are reflection regions R, the synthetic coefficient $\alpha_0$ may be calculated for each of the reflection regions R and the synthetic coefficient $\alpha_0$ may be reflected to α(x,y). Accordingly, even when the degree of polarization caused by the specular reflection differs in each region in the image obtained by capturing a wide angle, the synthetic coefficient can be more appropriately calculated for each of the reflection regions R.

[1-6. Configuration Using Polarization Images]

Although one kind of polarization image is used in the configuration above, the same processing may be performed using polarization images corresponding to polarization components in different directions.

Figure 5:
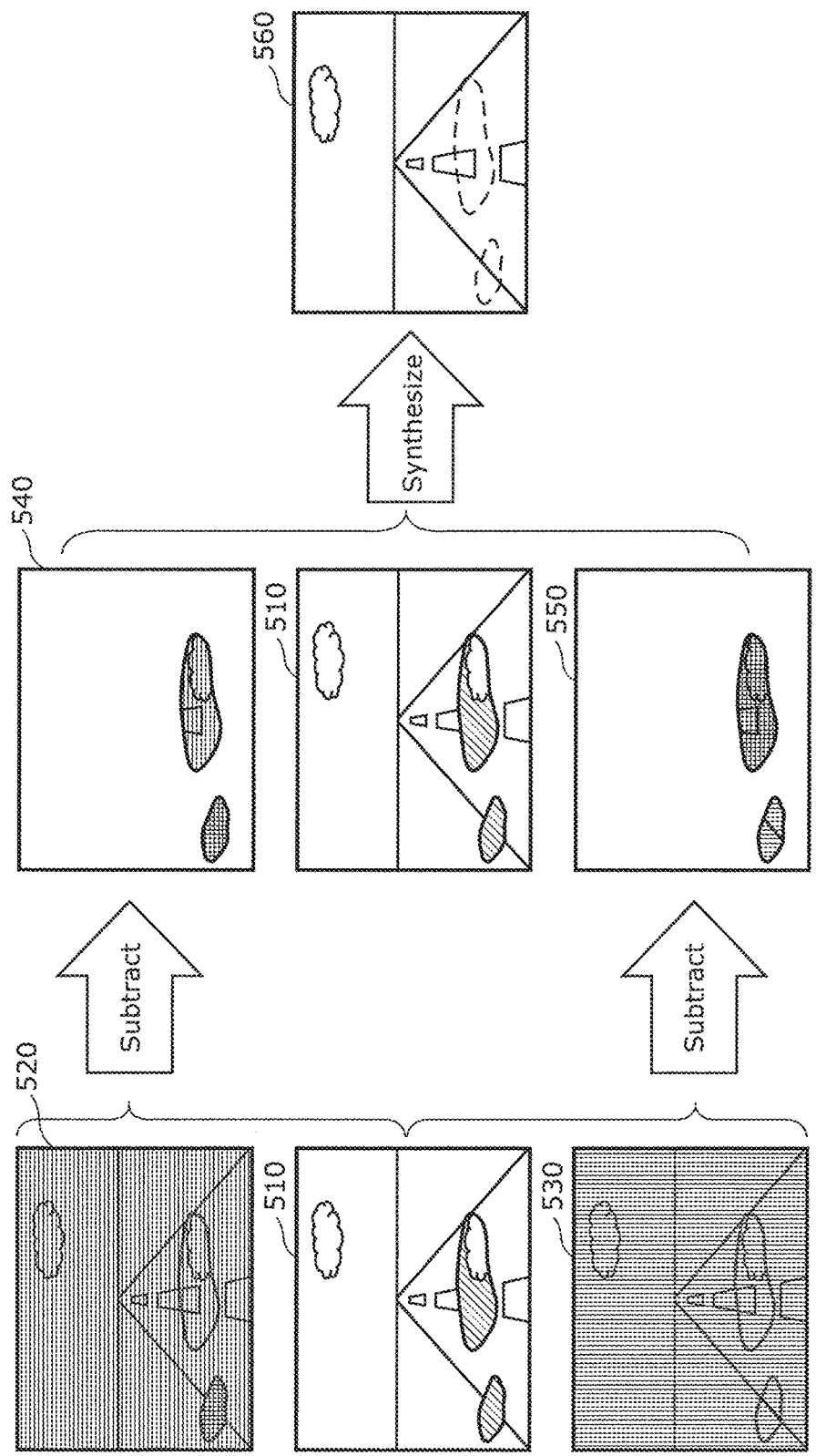
FIG. 5 schematically illustrates an image signal to be processed when two polarization images are captured using light with different polarization directions out of light from objects.

FIG. 5 schematically illustrates an image signal to be processed when two polarization images are captured using light in different polarization directions out of light from objects.

For example, as illustrated in FIG. 5, two polarization images 520 and 530 and a normal image 510 may be used. In such a case, a difference image between the normal image 510 and each of the two polarization images 520 and 530 is generated according to Equations 5 and 6 below.

[Math 5]

$$D_1(x,y) = I_{normal}(x,y) - I_{PL1}(x,y) \quad \text{(Equation 5)}$$

[Math 6]

$$D_2(x,y) = I_{normal}(x,y) - I_{PL2}(x,y) \quad \text{(Equation 6)}$$

Here, $D_1(x,y)$ denotes a difference image 540 generated from the normal image 510 and the polarization image 520. Furthermore, $D_2(x,y)$ denotes a difference image 550 generated from the normal image 510 and the polarization image 530.

Next, reflection regions R1 and R2 are defined using the difference images 540 and 550 respectively calculated from Equations 5 and 6. Then, synthetic coefficients $\alpha_1(x,y)$ and $\alpha_2(x,y)$ respectively corresponding to the difference images 540 and 550 are calculated from Equations 7 to 10.

[Math 7]

$$\underset{(x,y) \in R_1}{dark} \{I_{normal}(x, y) - \alpha_1 \cdot D_1(x, y)\} = \underset{(x,y) \in R_1}{dark} \{I_{normal}(x, y)\} \quad \text{(Equation 7)}$$

[Math 8]

$$\underset{(x,y) \in R_2}{dark} \{I_{normal}(x, y) - \alpha_2 \cdot D_2(x, y)\} = \underset{(x,y) \in R_2}{dark} \{I_{normal}(x, y)\} \quad \text{(Equation 8)}$$

[Math 9]

$$\alpha_1(x, y) = \begin{cases} \alpha_1 & (x, y) \in R_1 \\ 0 & (x, y) \in \overline{R_1} \end{cases} \quad \text{(Equation 9)}$$

[Math 10]

$$\alpha_2(x, y) = \begin{cases} \alpha_2 & (x, y) \in R_2 \\ 0 & (x, y) \in \overline{R_2} \end{cases} \quad \text{(Equation 10)}$$

Finally, a synthesized image 560 is generated from Equation 11 below.

[Math 11]

$$I_{no\_ref}(x,y) = \min\{(1-\alpha_1(x,y)) \cdot I_{normal}(x,y) + \alpha_1(x,y) \cdot I_{PL1}(x,y), (1-\alpha_2(x,y)) \cdot I_{normal}(x,y) + \alpha_2(x,y) \cdot I_{PL2}(x,y)\} \quad \text{(Equation 11)}$$

With the configuration, the specular reflection can be accurately reduced using the polarization images.

[1-7. Capturing Method]

Next, a method for capturing at least two image signals of a normal image and a polarization image of the same object will be described with reference to the drawings.

Figure 6A:
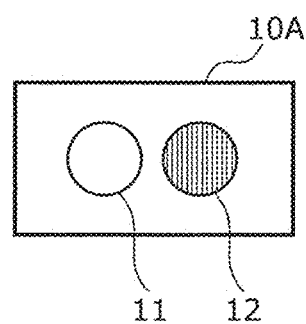
FIG. 6A is an elevation view of a light receiving unit in an imaging optical system that captures a normal image and a polarization image.
Figure 6B:
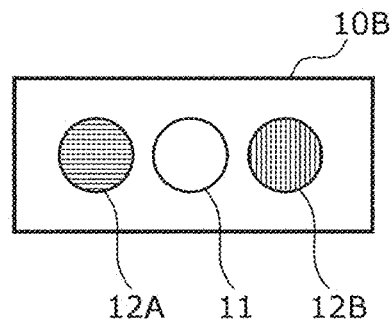
FIG. 6B is an elevation view of a light receiving unit in an imaging optical system that captures a normal image and a polarization image.

FIGS. 6A and 6B are elevation views of a light receiving unit in an imaging optical system that captures a normal image and a polarization image.

A light receiving unit 10A in FIG. 6A includes a normal aperture 11 and a polarizing filter unit 12 that is an aperture including a polarizing filter. When an image is captured using this light receiving unit 10A, the normal aperture 11 obtains an optical image for a normal image, and the polarizing filter unit 12 obtains an optical image for a polarization image.

Furthermore, a light receiving unit 10B in FIG. 6B exemplifies use of two different polarizing filters. Here, the light receiving unit 10B includes the normal aperture 11 and polarizing filter units 12A and 12B that are apertures each including a polarizing filter.

The light receiving units in FIGS. 6A and 6B can simultaneously capture images in the same imaging area.

Next, another example of an image capturing method will be described with reference to FIGS. 7A and 7B.

Figure 7A:
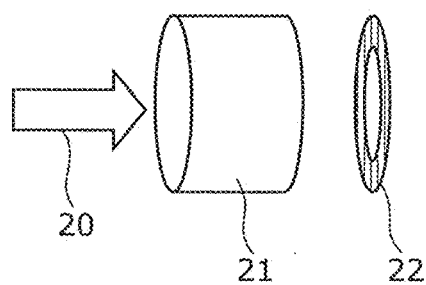
FIG. 7A is an outline perspective view illustrating a configuration of an imaging optical system that captures a normal image and a polarization image and includes an aperture and a polarizing filter disposed at a part of the aperture.
Figure 7B:
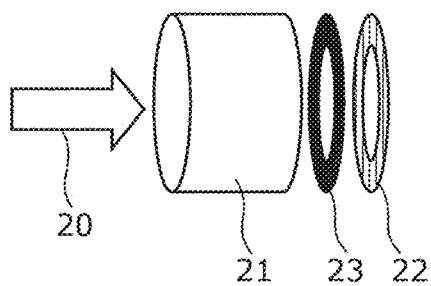
FIG. 7B is an outline perspective view illustrating a configuration of an imaging optical system that captures a normal image and a polarization image and includes an aperture and a polarizing filter disposed at a part of the aperture.

FIGS. 7A and 7B are outline perspective views illustrating a configuration of an imaging optical system that captures a normal image and a polarization image and includes an aperture 21 and a polarizing filter 22 disposed at a part of the aperture 21.

As illustrated in FIGS. 7A and 7B, the imaging optical system includes the aperture 21 through which incident light 20 passes, the polarizing filter 22, and a diaphragm 23. FIG. 7A illustrates the imaging optical system that can capture a polarization image. In contrast, FIG. 7B illustrates the imaging optical system that captures a normal image, by disposing the diaphragm 23 to shield the polarizing filter 22. As such, the configuration of FIGS. 7A and 7B can be switched using the optical diaphragm mechanism for capturing a normal image and a polarization image.

Furthermore, another example of an image capturing method will be described with reference to FIGS. 8A and 8B.

Figure 8A:
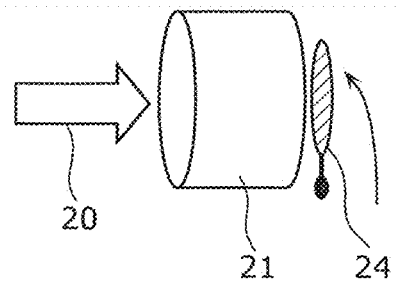
FIG. 8A is an outline perspective view illustrating a configuration of an imaging optical system that captures a normal image and a polarization image and includes an aperture and a polarizing filter that can be put in and out of a part of the aperture.
Figure 8B:
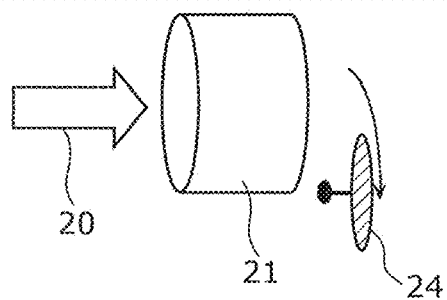
FIG. 8B is an outline perspective view illustrating a configuration of an imaging optical system that captures a normal image and a polarization image and includes an aperture and a polarizing filter that can be put in and out of a part of the aperture.

FIGS. 8A and 8B are outline perspective views illustrating a configuration of an imaging optical system that captures a normal image and a polarization image and includes the aperture 21 and a polarizing filter 24 that can be put in and out of a part of the aperture 21.

As illustrated in FIGS. 8A and 8B, the imaging optical system includes the aperture 21 through which the incident light 20 passes and the polarizing filter 24. The imaging optical system in FIG. 8A can capture a polarization image, by disposing the polarizing filter 24 through which the incident light 20 passes. In contrast, the imaging optical system in FIG. 8B can capture a normal image because the incident light 20 does not pass through the polarizing filter 24. The imaging optical system in FIGS. 8A and 8B can capture a normal image and a polarization image in a time-division manner, with the optical aperture totally opened.

Furthermore, another example of an image capturing method will be described with reference to FIG. 9.

Figure 9:
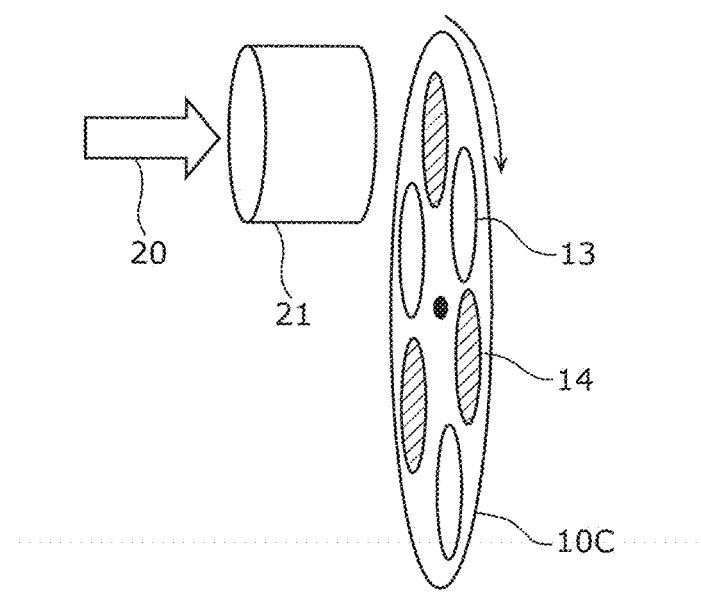
FIG. 9 is an outline perspective view illustrating a configuration with a rolling mechanism that allows switching between presence and absence of a polarizing filter behind an aperture of an imaging optical system that captures a normal image and a polarization image.

FIG. 9 is an outline perspective view illustrating a configuration with a rolling mechanism that allows switching between presence and absence of polarizing filters 14 behind the aperture 21 of an imaging optical system that captures a normal image and a polarization image.

As illustrated in FIG. 9, the imaging optical system includes a rotatable filter 10C and the aperture 21 through which the incident light 20 passes.

The filter 10C includes normal apertures 13 and the polarizing filters 14. By rotating the filter 10C, the imaging optical system in FIG. 9 can capture a normal image and a polarization image at high speed in a time-division manner, with the optical apertures totally opened.

Furthermore, another example of an image capturing method will be described with reference to FIG. 10.

Figure 10:
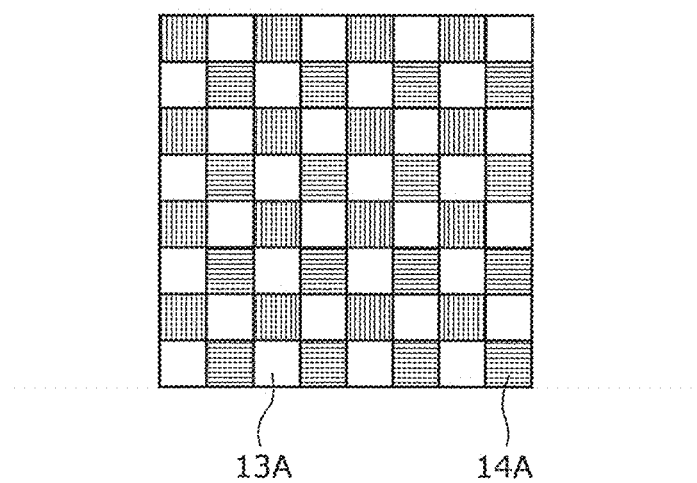
FIG. 10 is an elevation view of a configuration of polarizing filters in part of pixels in an image sensor included in an imaging device that captures a normal image and a polarization image.

FIG. 10 is an elevation view of a configuration of polarizing filters 14A in part of pixels in an image sensor included in an imaging device that captures a normal image and a polarization image. In the configuration of FIG. 10, the hatched pixels having the polarizing filters 14A obtain a polarization image, and simultaneously, the pixels having normal apertures 13A obtain a normal image.

[1-8. Summary]

The image processing method according to the present disclosure includes: obtaining a normal image captured with all polarization components of light from an object, and a polarization image captured with specific polarization components out of all the polarization components of the light (S201, S202); generating a difference image between the normal image and the polarization image (S203); calculating, using pixel values of the difference image, a coefficient to be multiplied by at least one of a pixel value of the normal image and a pixel value of the polarization image (S205); and synthesizing the normal image and the polarization image using a pixel value obtained by multiplying the coefficient by the at least one of the pixel value of the normal image and the pixel value of the polarization image to generate a synthesized image (S206).

This method allows obtainment of an image that has a higher S/N ratio and exhibits less specular reflection even under a dark environment, using a normal image and a polarization image that are captured from the same object. Here, the polarization image is an image that exhibits less specular reflection.

In the calculating (S205) of the image processing method, a reflection region that is a pixel region corresponding to a portion exhibiting specular reflection in the object may be defined in each of the normal image and the polarization image based on the pixel values of the difference image, and the coefficient to be multiplied by a pixel value of the reflection region may be calculated.

Accordingly, the reflection region that requires reduction in the specular reflection can be defined in the normal image. Thus, by calculating a coefficient to be multiplied by at least one of a pixel value of a reflection region in the normal image and a pixel value of a reflection region in the polarization image and synthesizing the normal image and the polarization image, image processing can be certainly performed on the reflection regions.

In the calculating (S205) of the image processing method, the coefficient to be multiplied by the pixel value of the reflection region among pixel values of the normal image may be calculated by comparing a pixel value of a region outside of the reflection region in the normal image with a pixel value of the reflection region in the synthesized image.

Since the pixel value of the reflection region can be determined using the pixel value outside of the reflection region, the pixel value of the reflection region in the synthesized image can be approximated to the pixel value outside of the reflection region in the normal image. Thus, reduction of the difference in pixel value between inside and outside of the reflection region in the synthesized image leads to generation of a natural synthesized image.

In the calculating (S205) of the image processing method, (i) a representative value of pixel values of a dark portion that is a portion outside of the reflection region in the normal image and (ii) a representative value of pixel values of a dark portion of the reflection region in the synthesized image may be determined, and the coefficient may be calculated to match the representative value of the normal image with the representative value of the synthesized image.

Accordingly, the pixel value in the dark portion of the reflection region in the synthesized image can be equal to the pixel value in the dark portion outside of the reflection region in the normal image. Thus, a natural synthesized image can be generated.

In the calculating (S205) of the image processing method, a plurality of the reflection regions may be defined based on the pixel values of the difference image, and the coefficient to be multiplied by the pixel value of each of the reflection regions among pixel values of the normal image and the polarization image may be calculated for the reflection region.

Accordingly, even when the degree of polarization caused by the specular reflection differs in each region in the image obtained by capturing a wide angle, the synthetic coefficient can be more appropriately calculated for each of the reflection regions.

(Embodiment 2)

Next, non-limiting Embodiment 2 will be described with reference to the drawings. Embodiment 2 describes reduction in the specular reflection in a color image. The main constituent elements herein are the same as those in Embodiment 1. However, Embodiment 2 differs from Embodiment 1 in the method for calculating a synthetic coefficient $\alpha(x,y)$.

Operations according to Embodiment 2, mainly the differences with Embodiment 1 will be described hereinafter.

[2-1. Operations by Image Processing Apparatus]

First, operations performed by the image processing apparatus 100 according to Embodiment 2 will be described with reference to the drawings.

Figure 11:
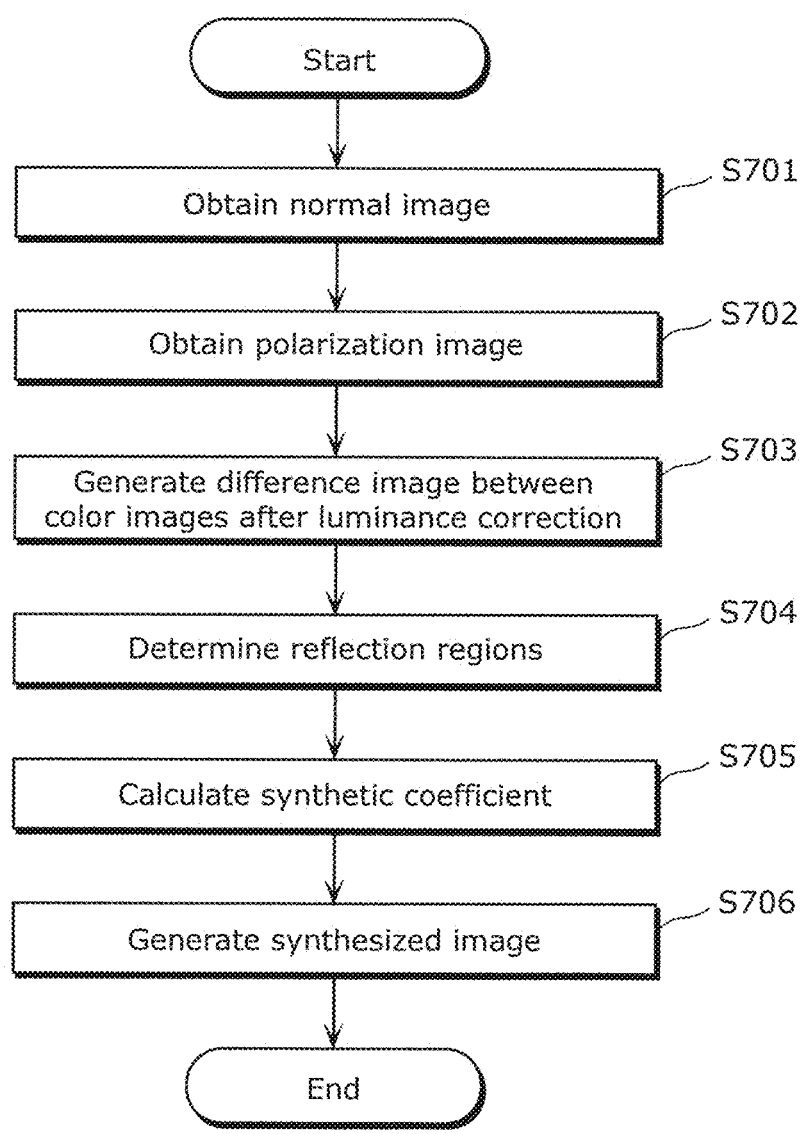
FIG. 11 is a flowchart for describing the entire operations performed by the image processing apparatus according to Embodiment 2.

FIG. 11 is a flowchart for describing the entire operations performed by the image processing apparatus 100 according to Embodiment 2.

As indicated in FIG. 11, the image obtaining unit 101 obtains a normal image and a polarization image that are both color images (S701 and S702).

Next, the subtracting unit 104 calculates a difference image between the color images according to Equation 12 below, using the normal image and the polarization image on both of which luminance correction has been performed (S703).

[Math 12]

$$D(x,y) = I_{normal}(x,y) - I_{PL}(x,y) \quad \text{(Equation 12)}$$

Here, $I_{normal}(x,y)$ and $I_{PL}(x,y)$ in each of which I is in bold type denote color vectors at a position(x,y) of the normal image and the polarization image on which the luminance correction has been performed, respectively. Furthermore, $D(x,y)$ denotes a color vector of the difference image at the position(x,y).

Next, the coefficient calculating unit 105 determines reflection regions R (S704). Here, the coefficient calculating unit 105 determines the reflection regions R based on the magnitude of the color vector of the difference image calculated at Step S703, in the same manner as at Step S204 according to Embodiment 1.

Next, the coefficient calculating unit 105 calculates a synthetic coefficient $\alpha(x,y)$ based on the color information (S705). The detailed operations at Step S705 will be described later.

Finally, the image synthesizing unit 106 synthesizes the normal image and the polarization image based on the synthetic coefficient $\alpha(x,y)$ calculated at Step S705, and outputs the synthesized image (S706).

[2-2. Operations for Calculating Synthetic Coefficient]

Next, the operations at Step S705 in FIG. 11 will be described with reference to the drawings.

Figure 12:
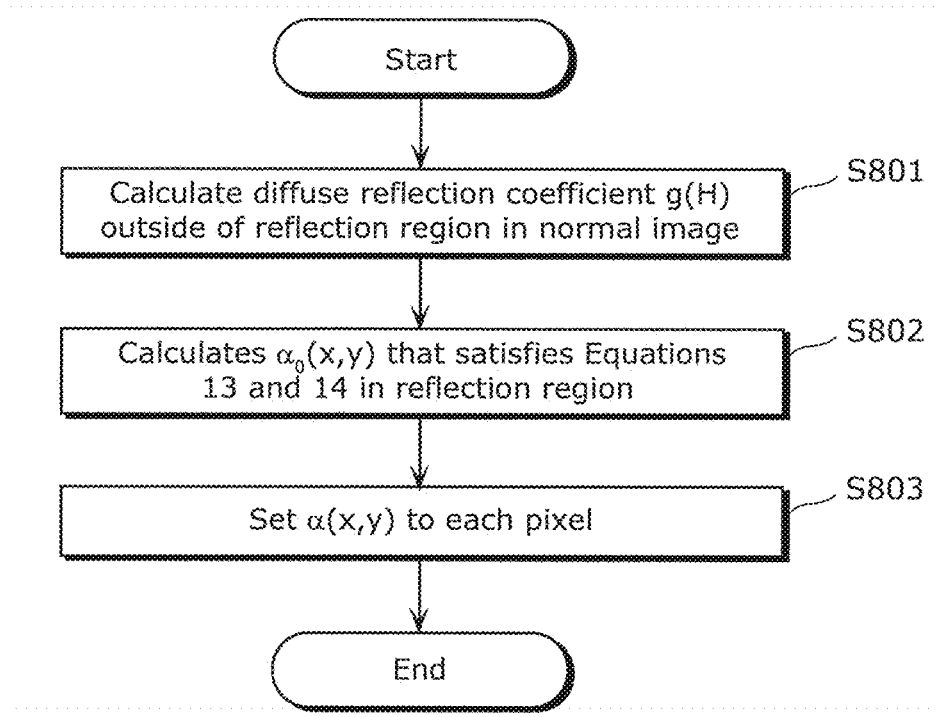
FIG. 12 is a flowchart indicating operations for calculating a synthetic coefficient by a coefficient calculating unit according to Embodiment 2.

FIG. 12 is a flowchart indicating operations for calculating a synthetic coefficient by the coefficient calculating unit 105 according to Embodiment 2.

First, the coefficient calculating unit 105 calculates a diffuse reflection coefficient g(H) for each hue H, outside of the reflection region R in the normal image (S801). Here, the diffuse reflection coefficient g(H) is a proportionality constant of an intensity V to a saturation S for each hue H. This proportionality constant can be obtained from the normal image in the method described in NPT 1.

Next, the coefficient calculating unit 105 calculates $a_0(x,y)$ that satisfies Equations 13 and 14 below in the reflection region R (S802).

[Math 13]

$$I_{no\_ref}(x,y) = I_{normal}(x,y) - \alpha_0(x,y) \cdot D(x,y) \quad \text{(Equation 13)}$$

[Math 14]

$$V(I_{no\_ref}(x,y)) = g(H(I_{no\_ref}(x,y))) \cdot S(I_{no\_ref}(x,y)) \quad \text{(Equation 14)}$$

Instead of Equation 13, $a_0(x,y)$ may be calculated to minimize the absolute value of the difference between the left and the right parts.

Finally, the coefficient calculating unit 105 sets the synthetic coefficient $\alpha(x,y)$ to each pixel based on Equation 15 below (S803).

[Math 15]

$$\alpha(x, y) = \begin{cases} \alpha_0(x, y) & (x, y) \in R \\ 0 & (x, y) \in \overline{R} \end{cases} \quad \text{(Equation 15)}$$

[2-3. Advantages]

In the calculating of a synthetic coefficient described with reference to FIG. 12, a diffuse reflection coefficient outside of the reflection region in the normal image that is a color image is calculated, and the synthetic coefficient is calculated based on the color properties of the specular reflection light and the diffuse reflection light. Thus, the synthetic coefficient can be calculated from images having a less number of dark pixels in or outside of the reflection region R. Furthermore, even with the presence of (i) the secondary reflection light that is hard to remove by the image processing described in NPL 1 and (ii) light sources having different colors, the specular reflection can be reduced.

(Advantages of Image Processing Method and Others According to Present Disclosure)

As described above, the image processing method and the image processing apparatus according to the present disclosure can obtain an image that exhibits less specular reflection, using a normal image and a polarization image that are captured from the same object. Thus, an image with a higher S/N ratio can be obtained even under a dark photographing environment.

Although a method for reducing the specular reflection light only using a polarizing filter (optical filter) has been conventionally used, it is necessary to match the polarization direction of the reflection light caused by the specular reflection to the direction of the polarizing filter to remove the reflection light. In contrast, the image processing method and the image processing apparatus according to the present disclosure can realize the advantage of reducing the specular reflection light by calculating a synthetic coefficient from a relative relationship between a normal image and a polarization image that are captured from the same object, even when the direction of the polarizing filter is not necessarily optimally disposed in capturing the polarization image.

Furthermore, in the method for removing the specular reflection using only the polarizing filter, a portion of the specular reflection is not removed even when the direction of the polarizing filter is optimally disposed but the angle of incidence of light incident on a surface of an object is not set to a specific value (Brewster's angle). The image processing method and the image processing apparatus according to the present disclosure can reduce the specular reflection regardless of the angle of incidence by generating a synthetic coefficient corresponding to a difference image, using dark pixels calculated from the normal image or a diffuse reflection coefficient calculated from the normal image.

Although the method described in PTL 1 disclosing the image processing by analyzing the reflection properties using polarization images requires in theory polarization images in different three directions or more, the image processing method and the image processing apparatus according to the present disclosure can perform image processing using only one polarization image and one normal image.

(Other Embodiments)

Embodiments 1 and 2 hereinbefore exemplify the techniques of the present disclosure. However, the techniques are not limited to these, and are applicable to embodiments by appropriately changing, replacing, adding, and omitting the constituent elements in Embodiments 1 and 2. Furthermore, combinations of the constituent elements in Embodiments 1 and 2 allow implementation of new embodiments.

For example, Embodiment 1 describes the image processing method using pixel values of gray scale images. Likewise, an embodiment in which the image processing methods according to Embodiments 1 and 2 are applied only to each color component of RGB or luminance components in a color image can produce the similar advantages.

Furthermore, the image processing apparatus 100 may selectively include the constituent elements according to the present disclosure, and the image processing method may selectively include the processes according to the present disclosure.

Furthermore, each of the constituent elements according to the present disclosure may be a circuit. These circuits may be combined into one circuit, or separate circuits. These circuits may be general-purpose circuits or dedicated circuits.

Furthermore, each of the processes according to the present disclosure may be executed by a computer. For example, the computer performs the process by executing a program using hardware resources such as a processor (CPU), a memory, and an input and output (I/O). Specifically, the processor performs the process by obtaining data to be processed from the memory or the I/O to calculate the data, and outputting a result of the calculation to the memory or the I/O.

Furthermore, the program for executing the process may be recorded on a non-transitory computer-readable recording medium, such as a CD-ROM. In such a case, the computer performs the process by reading the program from the non-transitory recording medium and executing the program.

INDUSTRIAL APPLICABILITY

The present disclosure is applicable to a device that obtains, records, and displays a captured image that exhibits less specular reflection. Specifically, the present disclosure is applicable to image processing apparatuses such as digital still cameras, video cameras, camera-equipped mobile phones, smartphones, video recorders, and televisions.

The invention claimed is:

1. An image processing method, comprising:
   obtaining a normal image captured with all polarization components of light from an object, and a polarization image captured with specific polarization components out of all the polarization components of the light;
   generating a difference image between the normal image and the polarization image;
   calculating, using pixel values of the difference image, a coefficient to be multiplied by at least one of a pixel value of the normal image and a pixel value of the polarization image; and
   synthesizing the normal image and the polarization image using a pixel value obtained by multiplying the coefficient by the at least one of the pixel value of the normal image and the pixel value of the polarization image to generate a synthesized image,
   wherein in the calculating, a reflection region that is a pixel region corresponding to a portion exhibiting specular reflection in the object is defined in each of the normal image and the polarization image based on the pixel values of the difference image, and the coefficient to be multiplied by a pixel value of the reflection region is calculated.

2. The image processing method according to claim 1, wherein in the calculating, the coefficient to be multiplied by the pixel value of the reflection region among pixel values of the normal image is calculated by comparing a pixel value of a region outside of the reflection region in the normal image with a pixel value of the reflection region in the synthesized image.

3. The image processing method according to claim 2, wherein in the calculating, (i) a representative value of pixel values of a dark portion that is a portion outside of the reflection region in the normal image and (ii) a representative value of pixel values of a dark portion of the reflection region in the synthesized image are determined, and the coefficient is calculated to match the representative value of the normal image with the representative value of the synthesized image.

4. The image processing method according to Claim 1, wherein in the calculating, a diffuse reflection coefficient outside of the reflection region in the normal image is calculated, and the coefficient to be multiplied is calculated using the diffuse reflection coefficient.

5. The image processing method according to Claim 1, wherein in the calculating, a plurality of reflection regions are defined based on the pixel values of the difference image, and the coefficient to be multiplied by the pixel value of each of the reflection regions among pixel values of the normal image and the polarization image is calculated for each of the reflection regions.

6. An image processing apparatus, comprising:
   an image obtaining unit configured to obtain a normal image captured with all polarization components of light from an object, and a polarization image captured with specific polarization components out of all the polarization components of the light;
   a subtracting unit configured to generate a difference image between the normal image and the polarization image;
   a coefficient calculating unit configured to calculate, using pixel values of the difference image, a coefficient to be multiplied by at least one of a pixel value of the normal image and a pixel value of the polarization image; and
   an image synthesizing unit configured to synthesize the normal image and the polarization image using a pixel value obtained by multiplying the coefficient by the at least one of the pixel value of the normal image and the pixel value of the polarization image to generate a synthesized image, wherein a reflection region that is a pixel region corresponding to a portion exhibiting specular reflection in the object is defined in each of the normal image and the polarization image based on the pixel values of the difference image, and the coefficient to be multiplied by a pixel value of the reflection region is calculated.

* * * * *